Aug. 25, 1936.  T. M. ROYAL  2,051,903
MANUFACTURE OF BAGS
Filed Dec. 19, 1930
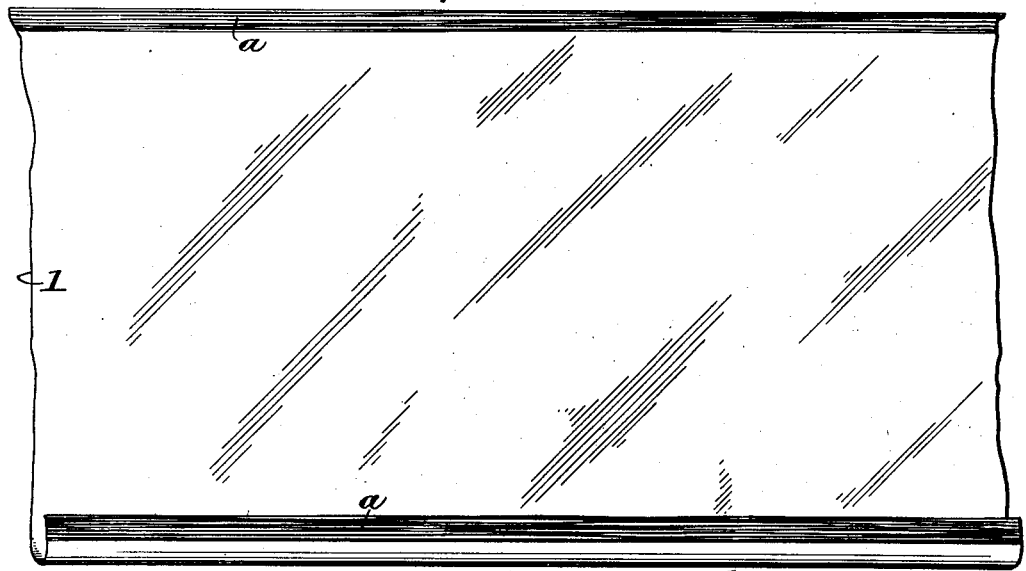
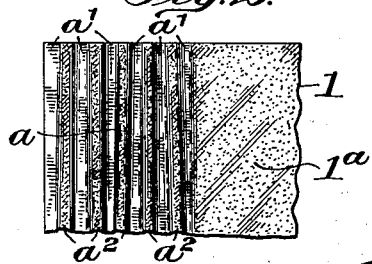
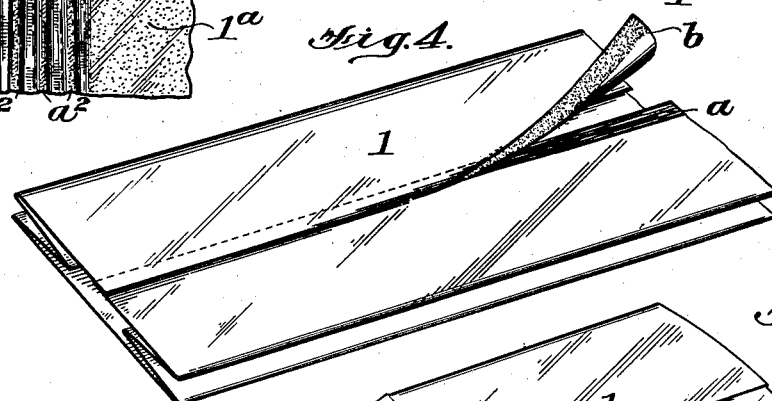
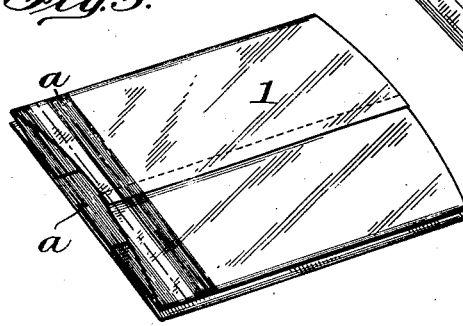
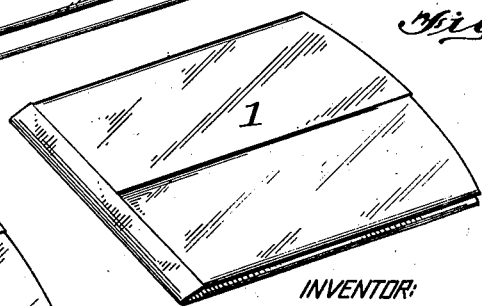
INVENTOR:
Thomas M. Royal
by Murray C. Boyer
Atty.

Patented Aug. 25, 1936

2,051,903

UNITED STATES PATENT OFFICE 2,051,903

MANUFACTURE OF BAGS

Thomas M. Royal, Philadelphia, Pa.

Application December 19, 1930, Serial No. 503,594

1 Claim. (Cl. 229—53)

My invention relates to the art of adhesively connecting together in overlapping relation sections of coated stock in various forms such as sheets, webs, laminae, films, pellicles, and/or the like, employed in the manufacture of various articles, such as bags, envelopes, and/or other forms of containers, and comprises an improved bag or similar container made from coated stock of a transparent character, such as "cellophane"; such coated stock being developed into a tube with a seam permanently adherent by adhesive uniting areas of the "cellophane" from which portions of its coating have been removed.

One important application of my invention is related to the manufacture of bags and similar containers, and while my invention is hereinafter described in broad, general terms, such description will include complete reference to the preparation of coated "cellophane" to receive an adhesive, and the manufacture therefrom of bags, and/or similar containers.

In the manufacture of bags and other articles, containers and the like, requiring that portions of the sheet or web making up the same shall be joined together in overlapping relation in the formation thereof, I employ as the material making up such bag or container, a section of a previously prepared and completely coated sheet, web, lamina, film or pellicle of the transparent material familiarly known as "cellophane" and whose coating serves to perform a function desirable in connection with the use to which the bags so made from such material are to be put. Any type of coated "cellophane" may be employed, and the coating may be of a waterproof character or a grease-proof character, or it may be a coating of any other nature and/or one where an ornamental effect is the desired purpose rather than resistance to moisture or grease. I propose to join this material together in tubular form upon bag machines of any usual character or type for subsequent formation into bag blanks, by any suitable or available adhesive usually employed in the joining of paper webs and/or the like, and which may be of any of the water-soluble glues, or pastes, or mucilages, or casein bodies; in fact, any cementitious body commonly employed in the art or which is or may be employed for connecting paper webs or sheets, or webs or sheets of textile material and/or the like.

In order to utilize such coated "cellophane" in the manner referred to I propose to remove or partially remove from predetermined zones or areas of the surface of the same, portions of the coating and thereby bare the surface of the body of original stock carrying such coating. Such removal may be effected by abrasion, scarification, shaving, or by any other operation, mechanical or otherwise, and it may proceed in relatively narrow spaces longitudinally of the sheet, web, or the like, or be performed upon areas or spaces of various forms and shapes. By thus removing the coating, partially or wholly, from portions of the "cellophane" sheets, webs, laminae, films or pellicles, the adhesive applied is capable of effecting the desired union between such treated portions of such coated stock since such adhesive bridges and/or directly connects the bodies or cores of the stock at the zones or areas from which the coating has been removed. In this manner it is possible to produce bags from one type of coated "cellophane" which has been rendered waterproof, without affecting its transparency, by the application of a lacquer coating, or a coating of pyralin, varnish, and/or the like.

These and other features of my invention are more fully set forth hereinafter; reference being had to the accompanying drawing, more or less diagrammatic in character, in which:

Figure 1 is a plan view of a portion of a web or sheet of coated material, such as "cellophane" showing the manner in which edge portions of the same have been prepared for the reception of an adhesive designed to secure such edges together in overlapping relation.

Fig. 2 is a fragmentary view, greatly enlarged, illustrating an edge portion of a sheet of coated stock, such as "cellophane", prepared for the reception of an adhesive by abrading, scarifying or otherwise operating upon the same to an extent sufficient to remove a portion of the coating down to the core or original body of the coated stock; such abrasion or scarification following lines which may be parallel or substantially parallel with or to the edge of such sheet or web of coated stock.

Fig. 3 is a cross-sectional view, greatly enlarged of two portions of a sheet or web (or independent sheets or webs) of material such as coated "cellophane" in connected relation effected by an interposed layer or film of adhesive which bridges and connects the bodies of such sheet (or sheets) or web (or webs) from which the coating has been removed.

Fig. 4 is a perspective view of a tubular element of a type or character produced upon ordinary bag machines; being shown in the present instance as a bellows-folded tube, and illustrating clearly the manner in which the marginal edge portions of a sheet, such as that shown in Fig. 1, are disposed or arranged in overlapping relation and secured together.

Fig. 5 is a perspective view of a blank cut from a tube of the character illustrated in Fig. 4, ready to be bottomed by folding or turning the end of the same and securing it to one wall of the blank; the end of such blank that is subsequently folded over having been prepared for the reception of the adhesive by abrading or scarifying the same as indicated by the cross lining, and Fig. 6 is a perspective view of the completed bag.

My improvements have been directed to the development of bags or similar containers from "cellophane" of the coated type; such bags being formed from blanks severed from a tube of suitable character which may be plain or provided with bellows-folded sides. In the production of such tube, it is necessary to seam the material longitudinally thereof, and to complete the bag, one end of the blank is folded over and secured to a wall thereof to serve as the bottom of the finished bag.

To insure adherence of the meeting surfaces of the coated "cellophane" in the formation of a tube from which such bags are formed, I propose to remove from such surfaces areas of the coating so that the adhesive applied may contact with the body of the coated material. This removal may be effected by an abrasive action, and it may be confined to a portion of the coated surfaces, or the entire coating of the surfaces to be subsequently secured together may be removed, as may be desired. This coating may be removed in many ways; abrasive wheels may be arranged to contact with the same, or cutting instruments may be employed to scarify the areas intended to receive the adhesive. The scarification or abrasion may proceed in parallel, or substantially parallel lines, as illustrated in Fig. 1, although such parallel arrangement is not necessary in carrying out my invention, and my invention includes any means of scarifying, or abrading, or otherwise removing portions of the coating longitudinally or substantially longitudinally of the edges of the coated "cellophane" to an extent sufficient to permit application of an adhesive thereto, capable of effecting a permanent joint or seam with another section of another or the same coated stock similarly prepared.

In order that articles such as bags, for instance, may be completed by folding or turning over an end portion of a blank, the body of the blank must be scarified or abraded adjacent to such end before the adhesive is applied, in the manner, for instance, as indicated in Fig. 5. A portion of this scarification may be performed upon the initial web or sheet before it is transformed into the tube, if the means for severing the tube into blanks can be so arranged as to insure proper registry with the scarified or abraded portions designed to receive the adhesive.

Figure 1 of the drawing illustrates a section of coated stock, indicated at 1, from which articles of various character may be made. In this instance, this sheet of stock represents a sheet of coated "cellophane" or "cellophane" whose coating inhibits the application of an adhesive. This view of the drawing represents the material after it has been prepared for the application of an adhesive to opposite sides of the same directly adjacent to the edges thereof. The scarified or abraded edges are indicated at a, and these edges are intended to be brought into overlapping relation and secured or joined by an interposed layer of adhesive applied in any usual manner commonly employed at the present time. Fig. 1 shows the lower edge of the sheet material as turned to bring out clearly that the abrasive or scarifying operation is performed upon the surface of opposite sides of the sheet at opposite paralleling or substantially paralleling edges of the same. In ordinary practice this sheet material will be fed continuously from a roll, and the treatment of the edges to remove the coating will proceed as the sheet is moved. This arrangement, however, does not preclude the use of other means for removing the coating, nor does it preclude the use of individual sheets with portions or zones of coating removed preparatory to being formed into bags, envelopes, or similar containers.

To bring out clearly the features of my invention, I have illustrated in Fig. 2, and in Fig. 3, greatly enlarged sections of coated sheets, webs or the like; coated "cellophane" for instance, in which the coated surface is indicated at $1^a$. Fig. 2, is a view of the surface of a coated sheet at an edge portion of the same; such view showing the edge portion scarified or abraded to an extent sufficient to remove the coating and bare the stock constituting the sheet which has received such coating. In this view, the abrasion or scarification is diagrammatically illustrated in the form of grooves or valleys $a'$, between ridges or ribs $a^2$ of the coating material. The depth of such grooves or valleys is such as to have bared the core of the sheet or web. Fig. 3 shows a cross sectional view of two sections of the coated stock prepared in the manner illustrated in Fig. 2 and connected together; the solid heavy line indicated at b, representing a film of adhesive permanently joining together such sections; such adhesive contacting with the initial stock or core from which the coating has been removed.

Fig. 4 illustrates a perspective view of a section of tubing formed from the coated stock; one corner at one end being partially turned up to show the abraded or scarified edge portions which are disposed in overlapping relation and to one of which a body of adhesive, indicated at b, has been applied. Fig. 5 represents a bag blank cut from a complete tube, such as illustrated in Fig. 4, and Fig. 6 illustrates the finished bag. It will be understood, of course, that the bags may be of plain folded type, that is to say of two-ply character without the bellows-folded sides, without departing from my invention.

In order that the end of a blank such as illustrated in Fig. 5 may be prepared for the reception of the adhesive, I may provide means forming part of or associated with the tube-forming mechanism whereby an abrading implement, wheel, or the like, may be caused to cross the tube adjacent to or at the end of a blank just before the latter is severed from such tube, in order to remove such quantity or portion of the coating as will permit application of the film of adhesive to join the two portions of blank when the end of the same is folded over or turned to produce the bottom. In lieu of this, the original coated sheet presented to the tube-forming mechanism of the bag machine may be scarified or abraded in zones or areas that will register and be present in the position illustrated in Fig. 5 as the blanks are cut from the tube. This arrangement, or any arrangement that proposes to abrade or otherwise remove the surface coating while the sheet is passing through the machine, before or after the tube formation, does not preclude the preparation of blanks in the manner indicated, and the presentation of the same to means that will successively and successfully remove a sufficient portion of the coating from one end of the same as to permit such end to be secured to the body of the blank and thus form the bottom of the bag.

It will be understood, of course, that any means may be employed for operating the abrading or scarifying elements when the same are utilized for the intended purpose, and no limitation is to be understood as affecting the manner or mode of effecting such abrasion or scarification before or after the production of the blank.

While I have referred specifically to the production or manufacture of bags and similar containers as an important use to which my invention may be applied, I wish it to be entirely clear that the idea of removing a coating from a sheet or body of "cellophane" so that such sheet or body may be secured by an adhesive to another sheet or body prepared in the same or similar manner, is to be considered in the broadest possible aspect as affecting all forms of coatings applied to sheets, webs, laminae, films, or pellicles of "cellophane" in order that such "cellophane" may be adhesively connected or secured together in overlapping relation at edge portions or otherwise.

While I have illustrated in the accompanying drawing steps in the preparation of a sheet or film of "cellophane", subsequently connected or joined together adhesively and employed in the making of bags having bellows-folded sides, it will be understood that similar steps may be followed in the making of bags of any type; satchel bottom bags, automatic bags, as well as for the making of any type of commercial envelopes, and that such bags or envelopes, of any type, may be made from sheets of coated "cellophane" of any size or shape, or from continuous lengths of "cellophane", and that such articles may be made by hand or by any form of machinery which has been employed, or which may be employed in the making of bags of any style or character, or envelopes of any style or character.

I claim:

As a new article of manufacture, a bag or similar container made from a blank formed from a longitudinally seamed tube of coated "cellophane" and wherein the seam of the tube is permanently adherent by a film of adhesive uniting predetermined areas of the "cellophane" from which portions of its coating have been removed in substantially longitudinal lines; such coating having been removed from the zones of such "cellophane" to be united by an abrasive action applied directly to the surface of the coated "cellophane".

THOMAS M. ROYAL.